H. R. NEVENS.
TRAIN CONTROL DEVICE.
APPLICATION FILED OCT. 30, 1912.

1,174,022.

Patented Feb. 29, 1916.
2 SHEETS—SHEET 2.

WITNESSES
Ida S. Clement.
Victoria Lorden

INVENTOR
HERBERT R. NEVENS
BY
ATTY.

UNITED STATES PATENT OFFICE.

HERBERT RUSSELL NEVENS, OF HARTFORD, CONNECTICUT, ASSIGNOR TO NEVENS-WALLACE TRAIN CONTROL CO., OF WALTHAM, MASSACHUSETTS, A CORPORATION OF MASSACHUSETTS.

TRAIN-CONTROL DEVICE.

1,174,022. Specification of Letters Patent. Patented Feb. 29, 1916.

Application filed October 30, 1912. Serial No. 728,581.

*To all whom it may concern:*

Be it known that I, HERBERT R. NEVENS, a citizen of the United States, residing at Hartford, county of Hartford, State of Connecticut, have invented certain new and useful Improvements in Train-Control Devices, of which the following is a specification.

This invention relates to train stop devices and particularly to an automatic safety control adapted to be used in connection with a compressed air or other brake setting system.

My present invention is an improvement of the apparatus set forth in my prior application, Serial No. 690,448, filed April 12, 1912, and includes various improvements in the operating and setting mechanism as well as a generally improved structure. This structure is presented as an improved embodiment and its details together with the operation thereof will be presented in detail in the specification which follows.

Figure 1:
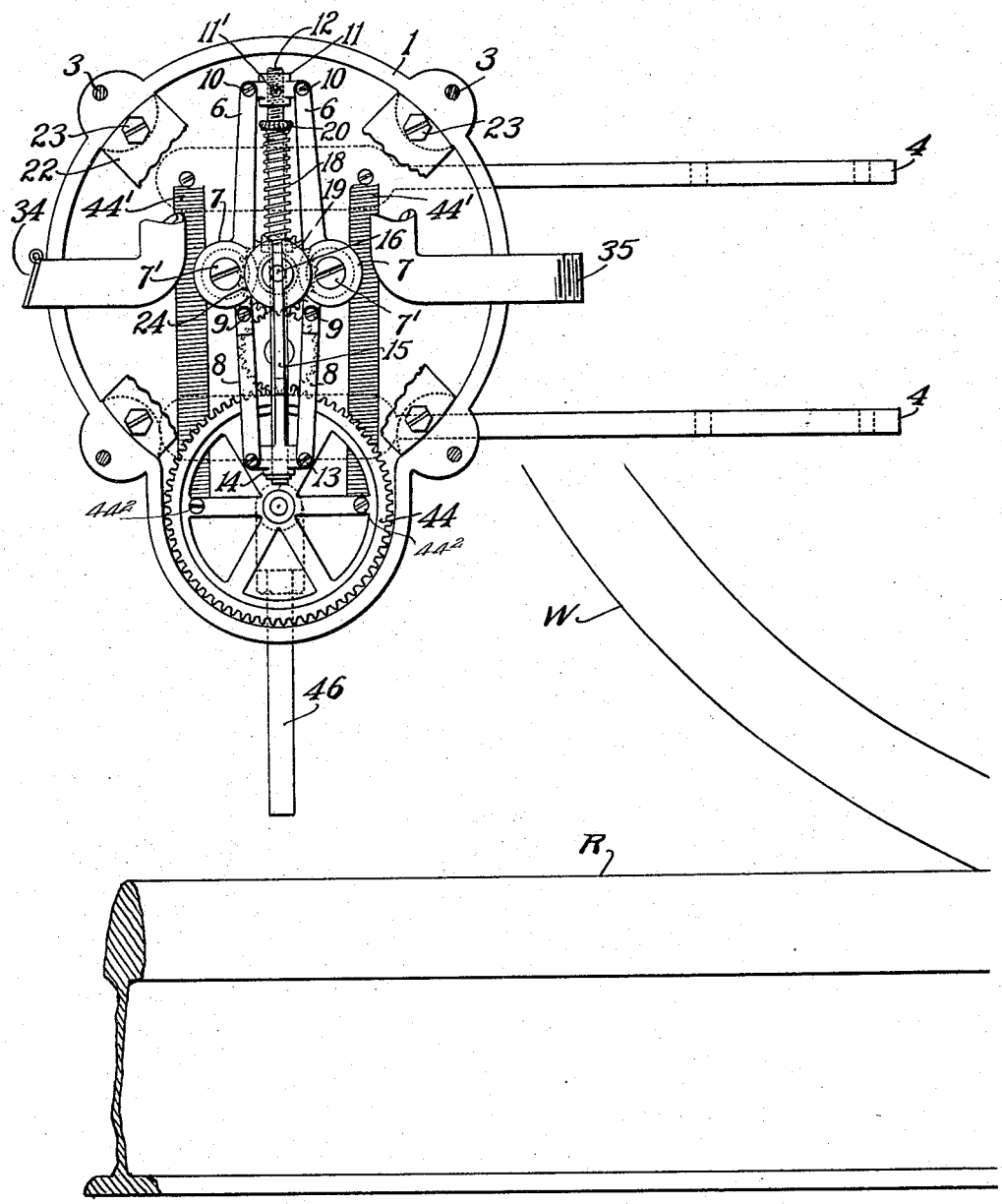
Figure 2:
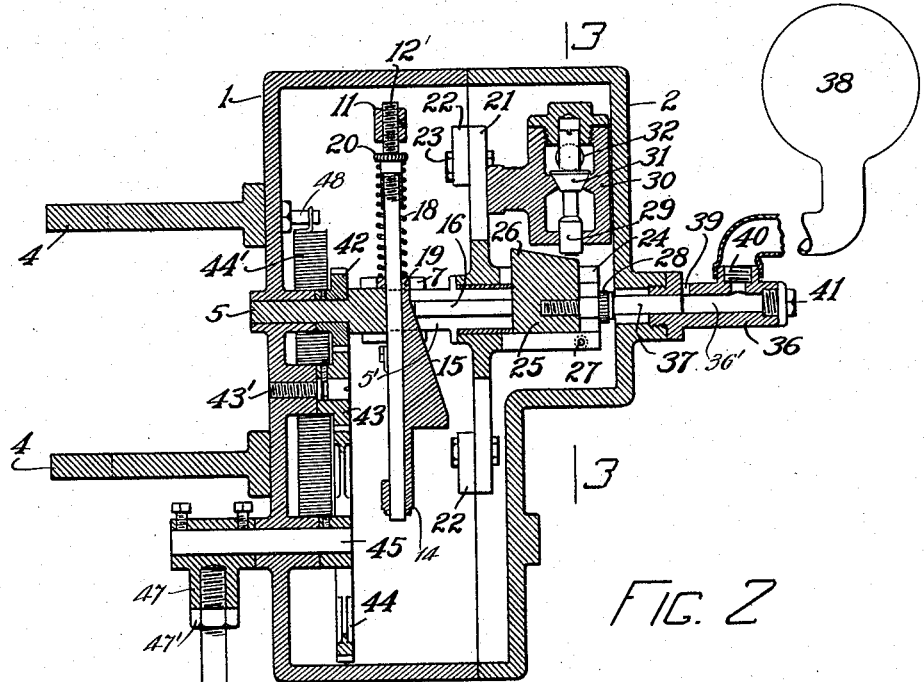
Figure 3:
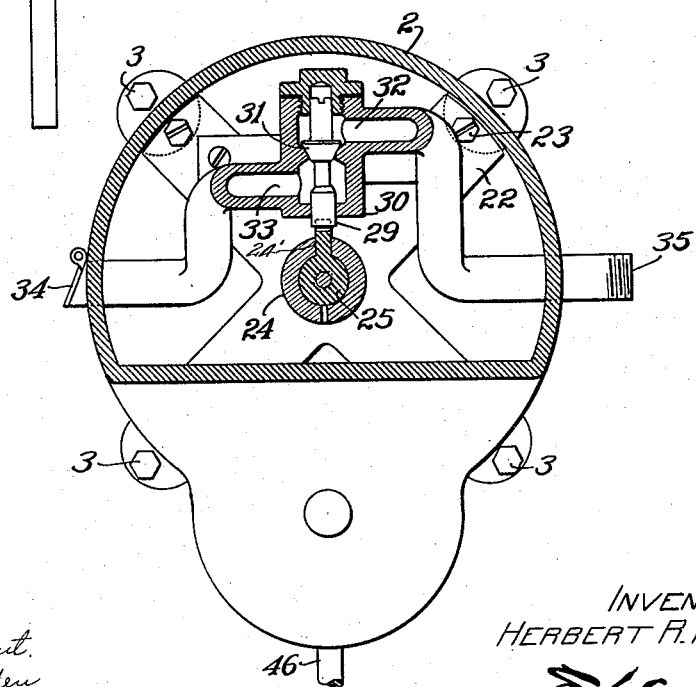

Throughout specification and drawings like reference numerals will be employed to indicate corresponding parts and in the drawings, Figure 1 is a view of my device with the casing opened up and with a wheel to show the relative positioning of the device. Fig. 2 is a central vertical section of my device, and Fig. 3 is a section on the line 3—3 of Fig. 2.

My apparatus is inclosed in a casing 1 having a removable section 2 removably attached thereto by bolts 3. The casing is suitably mounted by means of brackets 4—4. The device is preferably mounted on the pony trucks of the locomotive, but may be carried on any part of a train and I have merely indicated at W a wheel and at R a rail. Within the casing 1 is journaled a shaft 5, the inner end of which finds a bearing at the center of a spider 21 held by bolts 23 to internal ears 22. The shaft 5 is bored to receive a rod 16 and is slotted at $5^1$ and in said slot is guided a wedge shaped slide 15. The slide 15 has a lower end 14 bored to run on the transverse rod 12 threaded at its upper end $12^1$.

An internally threaded block 11 is screwed in to proper position on the threaded end $12^1$ and held by a set screw $11^1$. Pivoted to the block 11 are a pair of links 6 which have at their lower ends counter bored enlargements 7 which are adapted to receive a suitable number of shot to make of them weighted elements for centrifugal action. These are connected by links 8 pivoted thereto at 9 and connected at their lower ends by pivots 13 to the end 14 of the block 15.

A milled nut 20 is adjustably positioned on the threads $12^1$ and between the nut 20 and the top bearing 19 of the block 15 is interposed a spring 18. The top bearing 19 also slidably embraces the transverse rod 12 and also forms a downward stop for the movement of the block 15 as it abuts against the shaft 5. By adjusting the nut 20 the resistance of the spring 18 to the rise of the wedge 15 is proportioned to a predetermined speed of the engine at which the device is to operate.

The spider 21 is extended in a central hub or boss 24 which is centrally bored and vertically slotted at $24^1$. Longitudinally slidable in the slot $24^1$ is a block 25 having an upper inclined face 26 set in line with the valve stem 29 of a valve 31 which opens up the chamber 32 and places it in communication with the exhaust chamber 33 which discharges through a short connection leading outside of the casing and closed by the flap valve 34 to exclude the dirt.

Adjustably set in the block 25 is a stem 37 which projects into a fitting 36 having a longitudinal bore $36^1$ and a lateral branch 40 connected by suitable piping to a bulb 38 or any other suitable pneumatic actuating source. A vent 39 is provided in the fitting 36 so that when the stem 37 is in closed position the fitting is open to the air. The outer end of the bore $36^1$ is closed by a plug 41 which may be removed and the rod 37 pushed in by positive means.

The shaft 5 is rotated by a gear 42 which meshes with a gear 43 set on a stud $43^1$ tapped into the casing 1. Meshing with the gear 43 is a larger gear 44 fast on a shaft 45 and moved by a trip arm 46 adjustably set in a casting 47 and held by a loose nut $47^1$. The movement of the gear 44 is opposed by a pair of springs $44^1$ attached at $44^2$ to opposite sides of the gear 44 and fast at their upper end to pins 48 set in the casing 1. The tripper 46 is preferably mounted just behind the wheel W and over the rail R.

In operation the tripper arm 46 is struck by any suitable stop (not shown) and given a throw in proportion to the speed at which the train is traveling. This correspondingly rotates the gear 44 which through the gear 43 turns the gear 42 and the shaft 5. This actuates the centrifugal device and causes the weights 7 to fly out proportionately to the impulse given. This raises the slide 15 against the spring 18 and the wedge portion of 15 forces the rod 16 outwardly against the block 26. This lifts the valve stem 29 and gives the corresponding opening of the air brake system. The device is restored to operative position by compressing the bulb 38 or by removing the plug 41 and inserting a pencil or screwdriver to thrust back the rod 37.

Various modifications may obviously be made in the form and operation of my device, all without departing from the spirit of my invention if within the limits of the appended claims.

What I therefore claim and desire to secure by Letters Patent is:

1. In a device of the class described, a casing, a shaft rotatably mounted therein, a trip arm on the outer end of said shaft, a gear on said shaft, a second shaft, a gear thereon, an intermediate gear meshing with both of said gears, a sliding wedge transversely movable on said second named shaft, a bar threaded at one end and mounted transversely on said second named shaft, a nut on said threaded end, a pair of links pivoted to one end of said bar, a second pair of links connected at one end to said links first mentioned, and at their other ends to said wedge, a resilient member between said nut and said wedge, a slidable block having an inclined surface and mounted in said casing, a stem bearing against said block and adapted to receive the thrust of said transverse wedge, and a brake system relief valve vertically disposed with its stem in the path of the movement of said inclined block.

2. In a device of the class described, a casing, a shaft rotatably mounted therein, a trip arm on the outer end of said shaft, a gear on said shaft, a second shaft, a gear thereon, an intermediate gear meshing with both of said gears, a sliding wedge transversely movable on said second named shaft, a bar threaded at one end, mounted transversely of said second named shaft, a nut on said threaded end, a pair of links pivoted to one end of said bar, a second pair of links connected at one end to said links first named, and at their other ends to said wedge, a resilient member between said nut and said wedge, a slidable block having an inclined surface and mounted in said casing, a stem bearing against said block and adapted to receive the thrust of said transverse wedge, a brake system relief valve vertically disposed with its stem in the path of the movement of said inclined block, a cylinder formed on said casing outside of said block, a piston set in said block and fitting said cylinder, and means within the control of the engineer for supplying air to said cylinder to reset said block and permit the reclosing of said valve.

3. In a device of the class described, a casing, a shaft rotatably mounted therein, a trip arm on the outer end of said shaft, a gear on said shaft, a second shaft, a gear thereon an intermediate gear meshing with both of said gears, a sliding wedge transversely movable on said second named shaft, a centrifugal device fixed to rotate with said shaft and connect it to said wedge, a slidable block having an inclined surface and mounted in said casing, a stem bearing against said block and adapted to receive the thrust of said transverse wedge, and a brake system relief valve vertically disposed with its stem in the path of the movement of said inclined block.

4. In a device of the class described, a casing, a shaft rotatably mounted therein, a trip arm on the outer end of said shaft, a gear on said shaft, a second shaft, a gear thereon an intermediate gear meshing with both of said gears, a sliding wedge transversely movable on said shaft, a centrifugal device fixed to rotate with said shaft and connect it to said wedge, a slidable block having an inclined surface and mounted in said casing, a stem bearing against said block and adapted to receive the thrust of said transverse wedge, a brake system relief valve vertically disposed with its stem in the path of the movement of said inclined block, a cylinder formed on said casing outside of said block, a piston set in said block and fitting said cylinder, and means within the control of the engineer for supplying air to said cylinder to reset said block and permit the reclosing of said valve.

5. In a device of the class described, a casing, a shaft rotatably mounted therein, a trip arm on the outer end of said shaft, a sliding block in said casing and having an inclined surface thereon, a centrifugally acting device rotatable relative to said shaft and operatively connected to move said wedge, and a brake system relief valve disposed with its stem in the path of the movement of said inclined block surface.

6. In a device of the class described, a casing, a shaft rotatably mounted therein, a trip arm on the outer end of said shaft, a sliding block in said casing and having an inclined surface thereon, a centrifugally acting device rotatable relative to said shaft and operatively connected to move said block, a brake system relief valve disposed with its stem in the path of the movement of said inclined block surface, a cylinder formed on said casing outside of said block, a piston set in said block and fitting said cylinder, and means within the control of the engineer for supplying air to said cylinder to reset said block and permit the reclosing of said valve.

7. In combination, a brake system relief valve, a centrifugally acting device, a valve actuating element controlled by said device, and a train carried trip effective upon contact with a track obstacle to impart to said centrifugal device and thus the valve actuating element a degree of effective movement in direct proportion to the force of impact, to open said relief valve to a degree directly proportionate to the train speed at the moment of impact.

8. In combination, a brake system relief valve, a normally inert relief device in operative association with said valve, means for restricting the operative movement of said device within predetermined limits, and a train carried trip effective upon contact with a track obstacle to overcome the inertia of said relief device and impart to it a degree of operative movement proportionate to the train speed at the moment of impact of said tripper with the track obstacle.

9. In combination, a relief valve, a normally inert relief device in operative association with said valve, a train carried tripper disposed for contact with a track obstacle and effective upon such contact to overcome the inertia of said relief device and impart to it a degree of operative movement proportionate to the speed of the train at the moment of impact, means actuated by relief device for opening said valve, and means to reset said valve actuative means after an effective actuation thereof.

10. In a device of the class described a rotatable shaft, a centrifugal device thereon, means operatively associated therewith for influencing a brake system relief valve, a trip effective to impart to said shaft and thereby to said centrifugally acting device a rotative tendency proportionate to its degree of throw when operatively influenced, and an adjustable element disposed to resist the rotative tendency of said centrifugally acting device.

11. In combination with the relief valve of an air brake system, a normally inert relief mechanism in association therewith, a track obstacle, and a train carried trip operatively connected with said relief mechanism and effective upon contact with said track obstacle to overcome the inertia of said relief mechanism and impart to it a momentive impulse proportionate to the degree of actuation of said trip whereby the air valve is vented in a degree proportionate to the effective impulse.

12. In combination with the relief valve of an air brake system, a normally inert relief mechanism in association therewith, a track obstacle, and a train carried trip operatively connected with said relief mechanism and effective upon contact with said track obstacle to overcome the inertia of said relief mechanism and impart to it a momentive impulse proportionate to the degree of actuation of said trip whereby the air valve is vented in a degree proportionate to the effective impulse, said relief mechanism being maintained in its venting relation to the valve until the parts are re-set.

13. In combination with the relief valve of an air brake system, a normally inert relief mechanism in association therewith, a track obstacle, and a train carried trip operatively connected with said relief mechanism and effective upon contact with said track obstacle to overcome the inertia of said relief mechanism and impart to it a momentive impulse proportionate to the velocity of the train whereby the air valve is vented in a degree directly proportionate to the effective impulse.

In testimony whereof I affix my signature in presence of two witnesses.

HERBERT RUSSELL NEVENS.

Witnesses:
  VICTORIA LOWDEN,
  VERA E. FOGG.

Copies of this patent may be obtained for five cents each, by addressing the "Commissioner of Patents, Washington, D. C."